(12) United States Patent
Lee et al.

(10) Patent No.: US 7,766,835 B2
(45) Date of Patent: Aug. 3, 2010

(54) ULTRASOUND SYSTEM AND METHOD FOR FORMING ULTRASOUND IMAGES

(75) Inventors: Jae Keun Lee, Seoul (KR); Chi Young Ahn, Seoul (KR)

(73) Assignee: Medison Co., Ltd., Kangwon-do (KR)

( * ) Notice: Subject to any disclaimer, the term of this patent is extended or adjusted under 35 U.S.C. 154(b) by 440 days.

(21) Appl. No.: 11/759,703

(22) Filed: Jun. 7, 2007

(65) Prior Publication Data

US 2008/0071175 A1    Mar. 20, 2008

(30) Foreign Application Priority Data

Sep. 19, 2006    (KR) ..................... 10-2006-0090671

(51) Int. Cl.
*A61B 8/00* (2006.01)

(52) U.S. Cl. ....................... 600/443; 600/437; 600/445; 600/447; 600/444

(58) Field of Classification Search ................. 600/437, 600/407, 444, 447, 448, 443, 445
See application file for complete search history.

(56) References Cited

U.S. PATENT DOCUMENTS

| | | | |
|---|---|---|---|
| 4,159,462 A * | 6/1979 | Rocha et al. | 367/97 |
| 4,991,589 A * | 2/1991 | Hongo et al. | 600/455 |
| 5,261,408 A | 11/1993 | Maslak et al. | |
| 5,899,861 A * | 5/1999 | Friemel et al. | 600/443 |
| 6,174,286 B1 | 1/2001 | Ramamurthy et al. | |
| 6,508,770 B1 | 1/2003 | Cai | |
| 6,814,701 B1 | 11/2004 | Tamura | |
| 2004/0054284 A1 | 3/2004 | Cai et al. | |

OTHER PUBLICATIONS

U.S. Appl. No. 11/759,596, filed Jun. 7, 2007, Lee et al.

* cited by examiner

*Primary Examiner*—Long V Le
*Assistant Examiner*—Joel F Brutus
(74) *Attorney, Agent, or Firm*—Oblon, Spivak, McClelland, Maier & Neustadt, L.L.P.

(57) ABSTRACT

The present invention provides an ultrasound system for forming an ultrasound image by using a plurality of sub-frames, comprising: a plurality of transducers for transmitting and receiving ultrasound signals along a plurality of scan lines to obtain sub-frames; a determination unit for locating a common point where extensions of said scan lines with respect to the transducers intersect, determine a plurality of virtual common points based on the located common point and determine a plurality of transducer groups, steering angles and a plurality of scan-line groups; a controller responsive to a change of the sub-frames to select scan lines corresponding to the changed sub-frame and adjust steering angles of the selected scan lines based on the plurality of transducer groups, the steering angles and the plurality of scan-line groups; and a processor for synthesizing the plurality of sub-frames to form an ultrasound image.

10 Claims, 11 Drawing Sheets

ULTRASOUND SYSTEM AND METHOD FOR FORMING ULTRASOUND IMAGES

The present application claims priority from Korean Patent Application No. 10-2006-0090671 filed on Sep. 19, 2006, the entire subject matter of which is incorporated herein by reference.

BACKGROUND

1. Field

The present invention generally relates to an ultrasound system, and more particularly to an ultrasound system and method for forming an ultrasound image.

2. Background

An ultrasound system has become an important and popular diagnostic tool since it has a wide range of applications. Specifically, due to its non-invasive and non-destructive nature, the ultrasound system has been extensively used in the medical profession. Modern high-performance ultrasound systems and techniques are commonly used to produce two or three-dimensional diagnostic images of internal features of an object (e.g., human organs).

The probe of an ultrasound system generally includes transducers for transmitting and receiving broadband ultrasound signals. When the transducers are electrically stimulated, ultrasound signals are generated and transmitted to the object. Signals reflected from the object and delivered to the transducers, which may be referred to as ultrasound echo signals, are electrically transformed. By performing amplification and signal processing on the transformed electrical signals, ultrasound image data can be generated.

Figure 1:
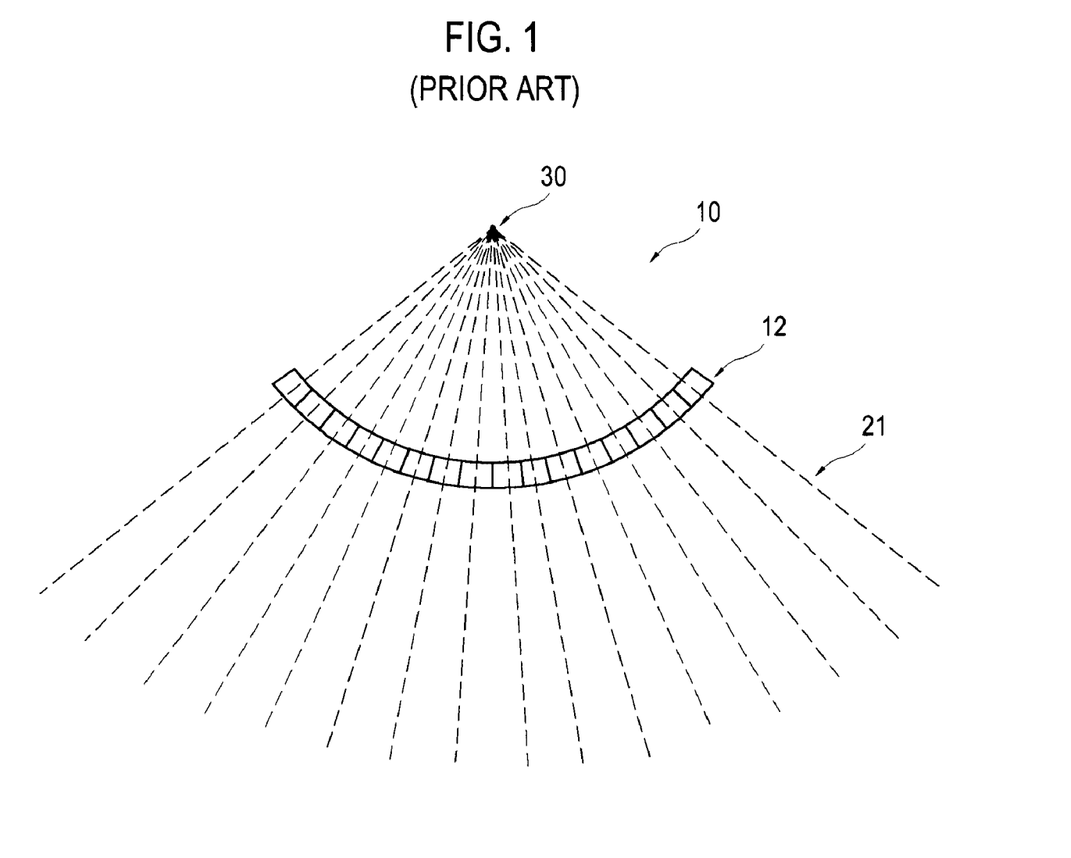
FIG. 1 shows a geometrical structure of scan lines for respective transducers of a curved linear probe.
Figure 2:
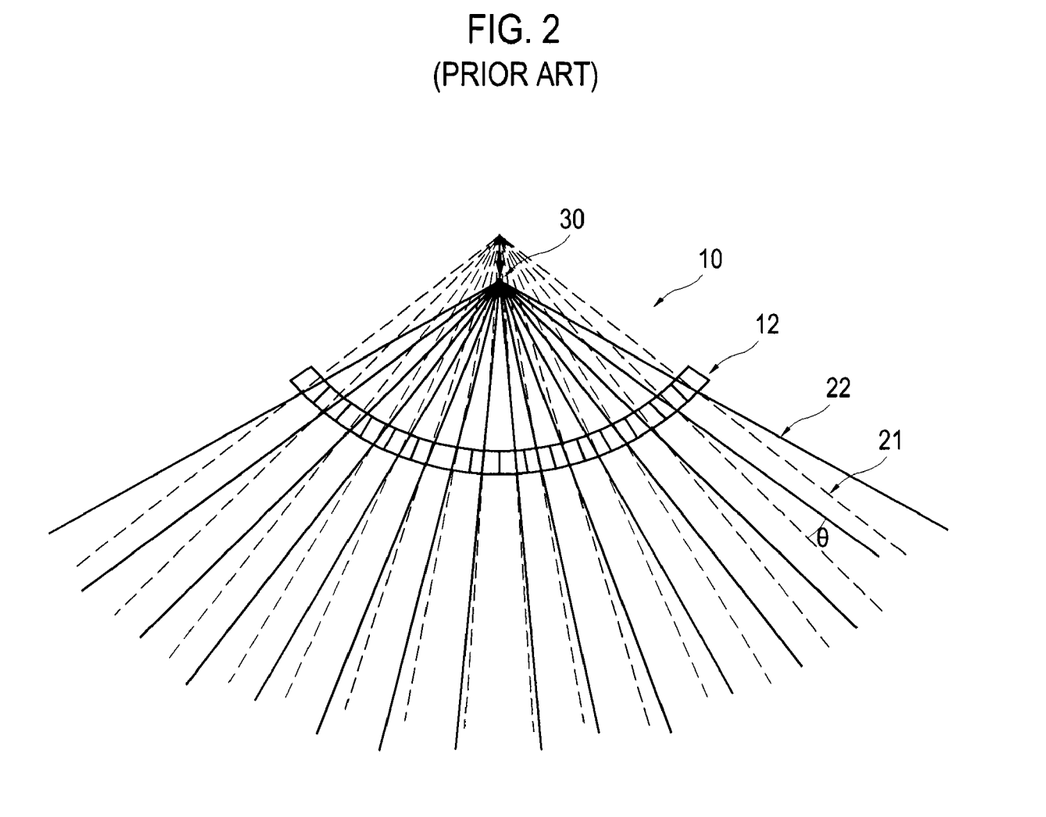
FIG. 2 shows a geometrical structure of scan lines for respective transducers of a conventional curved linear probe with adjusted steering angles.

In particular, a number of ultrasound systems employ a curved linear probe to transmit and receive ultrasound signals. Since the curved linear probe transmits ultrasound signals in radial directions, it can obtain an ultrasound image in an area wider than the size of the probe. FIG. 1 shows a geometrical structure of scan lines for the respective transducers in a curved linear probe. As illustrated in FIG. 1, when the respective scan lines 21 are extended back to the rear of the transducers 12, there appears a point 30, through which all the scan lines pass (hereinafter referred to as a "common point"). Conversely, steering angles of the respective scan lines 21 can be determined once the location of the common point 30 is determined. As shown in FIG. 2, when the common point 30 moves, the steering angles of the respective scan lines 21 change. Thereafter, by constructing new scan lines 22 according to the newly determined steering angles, an ultrasound image having a wider view angle can be obtained.

However, in a conventional ultrasound system, gaps formed between the scan lines become greater as the common point moves for a wider view angle. This deteriorates the quality of the ultrasound image, and more particularly the quality of the object located around the center of the ultrasound image.

BRIEF DESCRIPTION OF THE DRAWINGS

Arrangements and embodiments may be described in detail with reference to the following drawings in which like reference numerals refer to like elements and wherein.

DETAILED DESCRIPTION

A detailed description may be provided with reference to the accompanying drawings. One of ordinary skill in the art may realize that the following description is illustrative only and is not in any way limiting. Other embodiments of the present invention may readily suggest themselves to such skilled persons having the benefit of this disclosure.

An ultrasound system constructed in accordance with an embodiment of the present invention includes a plurality of transducers, a determination unit, a controller and a processor. The transducers transmit and receive ultrasound signals along a plurality of scan lines to obtain sub-frames. The determination unit locates a common point where extensions of the scan lines with respect to the transducers intersect, and determines a plurality of virtual common points based on the located common point. The determination unit then determines a plurality of transducer groups, steering angles and a plurality of scan-line groups. Based on the transducer groups, the steering angles and the scan-line groups, the controller selects scan lines corresponding to the changed sub-frames and adjusts steering angles of the selected scan lines as the sub-frame changes. The processor synthesizes the sub-frames to form an ultrasound image.

Figure 3:
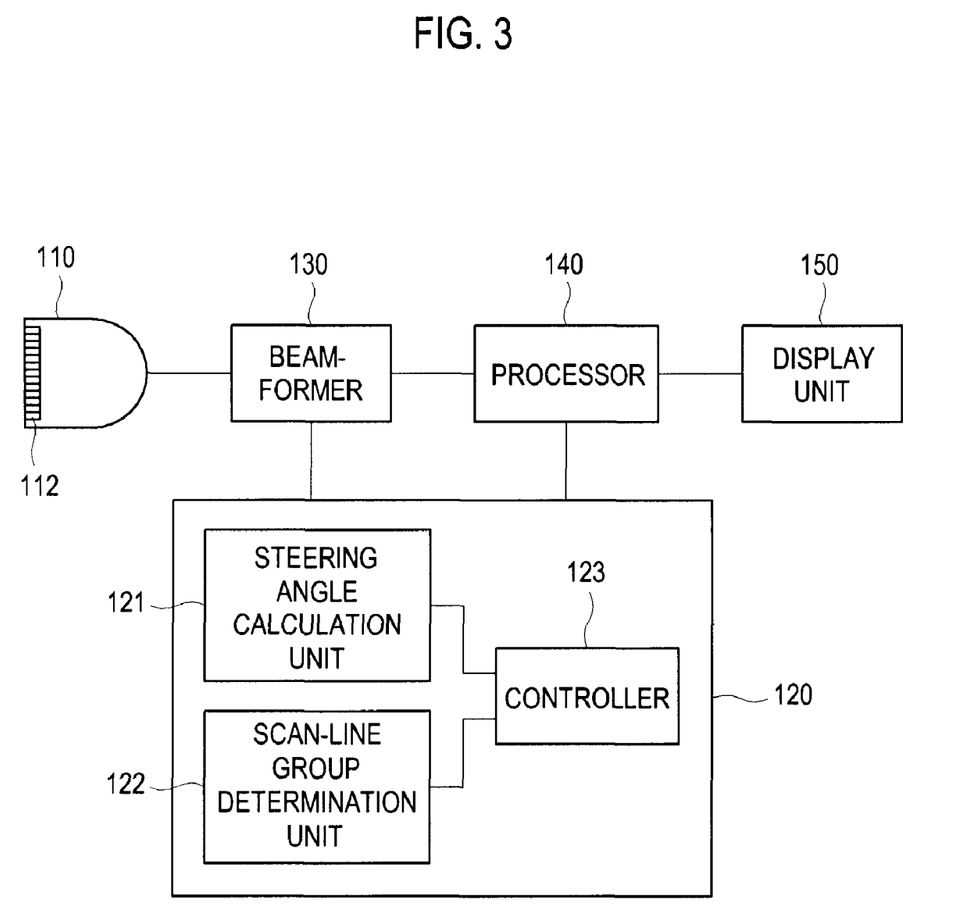
FIG. 3 shows a configuration of an ultrasound system constructed in accordance with an embodiment of the present invention.

Hereinafter, an embodiment of the present invention will be described with reference to FIGS. 3 to 11. As shown in FIG. 3, an ultrasound system 100 constructed in accordance with an embodiment of the present invention includes a probe 110, a scan-line determination unit 120, a beam-former 130, a processor 140 and a display unit 150.

The probe 110 includes a transducer array 112 comprising a plurality of transducers. The probe 110 transmits ultrasound signals to an object along scan lines and receives ultrasound signals reflected by the object. In an embodiment, the probe 110 may be a curved linear probe.

The scan-line determination unit 120 includes a steering angle calculation unit 121, a scan-line group determination unit 122 and a controller 123. The steering angle calculation unit 121 locates a plurality of virtual common points based on the common point where extensions of original scan lines for the respective transducers intersect. It then partitions a plurality of transducers into several groups based on the number of located virtual common points. Thereafter, the steering angle calculation unit 121 matches virtual common points to the respective transducer groups and calculates adjusted steering angles of the scan lines for the respective transducers.

Figure 4:
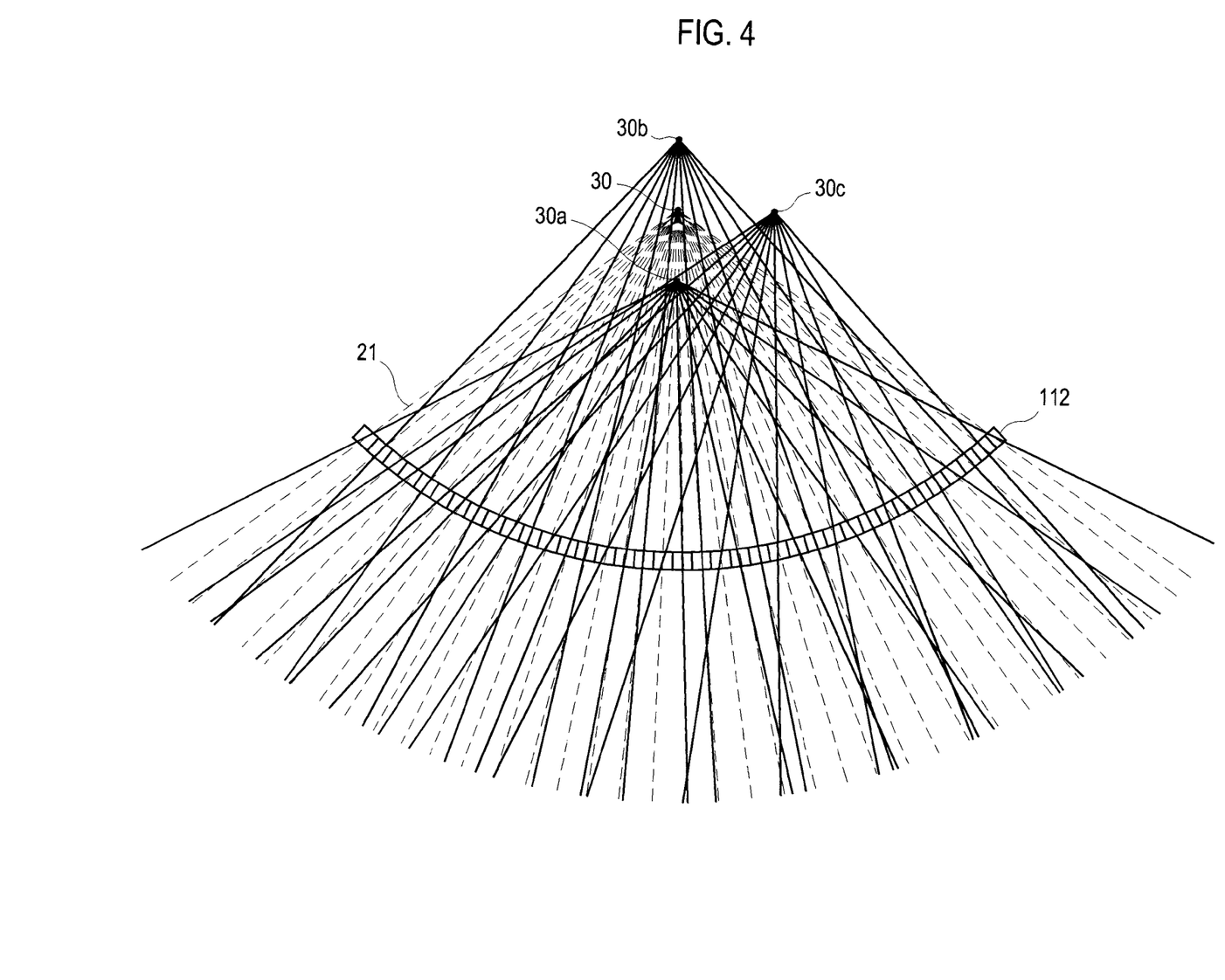
FIG. 4 shows an example of determining steering angles in accordance with an embodiment of the present invention.

In an embodiment shown in FIG. 4, based on the location of the common point 30 where extensions of the original scan lines 21 with respect to the respective transducers intersect, the steering angle calculation unit 121 may locate: a first virtual common point 30a by moving the common point 30 toward the transducer array 112; a second virtual common point 30b by moving the common point 30 far from the transducer array 112; and a third virtual common point 30c by moving the common point 30 in parallel with the transducer array 112. It may then partition a plurality of scan lines into 3 groups according to the number of the located virtual common points. That is, among a plurality of transducers $T_1$ to $T_n$, the steering angle calculation unit 121 may determine: transducers $\{T_1, T_4, T_7, T_{10}, \ldots\}$ as a first transducer group; transducers $\{T_2, T_5, T_8, T_{11}, \ldots\}$ as a second transducer group; and transducers $\{T_3, T_6, T_9, T_{12}, \ldots\}$ as a third transducer group. The steering angle calculation unit 121 may determine: the first virtual common point 30a as a virtual common point corresponding to the first transducer group; the second virtual common point 30b as a virtual common point corresponding to the second transducer group; and the third virtual common point 30c as a virtual common point corresponding to the third transducer group. Thereafter, the steering angle calculation unit 121 calculates steering angles of the scan lines for the respective transducers based on the location of the corresponding virtual common points.

Although the above embodiment partitions a plurality of transducers into three groups based on three virtual common points, the present invention is not limited thereto. It is also possible to locate N number of virtual common points and to partition a plurality of transducers $T_1$ to $T_n$ based on the number N of the located virtual common points. For example, the plurality of transducers $T_1$ to $T_n$ may be partitioned so that the transducers $\{T_1, T_{N+1}, T_{2N+1}, T_{3N+1}, \ldots\}$ constitute a first transducer group, the transducers $\{T_2, T_{N+2}, T_{2N+2}, T_{3N+2}, \ldots\}$ constitute a second transducer group, and $\{T_N, T_{2N}, T_{3N}, T_{4N}, \ldots\}$ constitute an Nth transducer group.

Further, in the above embodiment, the common point is moved into vertical and horizontal directions to locate a plurality of virtual common points. However, the present invention is not limited thereto. That is, the common point may be moved in various directions to locate a plurality of virtual common points.

The scan-line group determination unit 122 determines scan-line groups to obtain a plurality of sub-frames. Assume that three virtual common points 30a, 30b and 30c are located by the steering angle calculation unit 121 and transducer groups are determined based on the three located virtual common points 30a, 30b and 30c in accordance with an embodiment of the present invention. Then, the scan-line group determination unit 122 may determine, among a plurality of scan lines $S_1$ to $S_n$: scan lines $\{S_1, S_4, S_7, S_{10}, \ldots\}$ corresponding to the first transducer group as a first scan-line group to obtain a first sub-frame; scan lines $\{S_2, S_5, S_8, S_{11}, \ldots\}$ corresponding to the second transducer group as a second scan-line group to obtain a second sub-frame; and scan lines $\{S_3, S_6, S_9, S_{12}, \ldots\}$ as a third scan-line group to obtain a third sub-frame. Although the above embodiment describes partitioning a plurality of scan lines into three scan-line groups based on the three virtual common points, the present invention is not limited thereto. For example, it is also possible to partition a plurality of scan lines $S_1$ to $S_n$ based on the number N of located virtual common points. As a further example, the scan lines $S_1$ to $S_n$ may be partitioned so that the scan lines $\{S_1, S_{N+1}, S_{2N+1}, S_{3N+1}, \ldots\}$ constitute a first scan-line group, the scan lines $\{S_2, S_{N+2}, S_{2N+2}, S_{3N+2}, \ldots\}$ constitute a second scan-line group, and $\{S_N, S_{2N}, S_{3N}, S_{4N}, \ldots\}$ constitute an Nth scan-line group.

Figure 5:
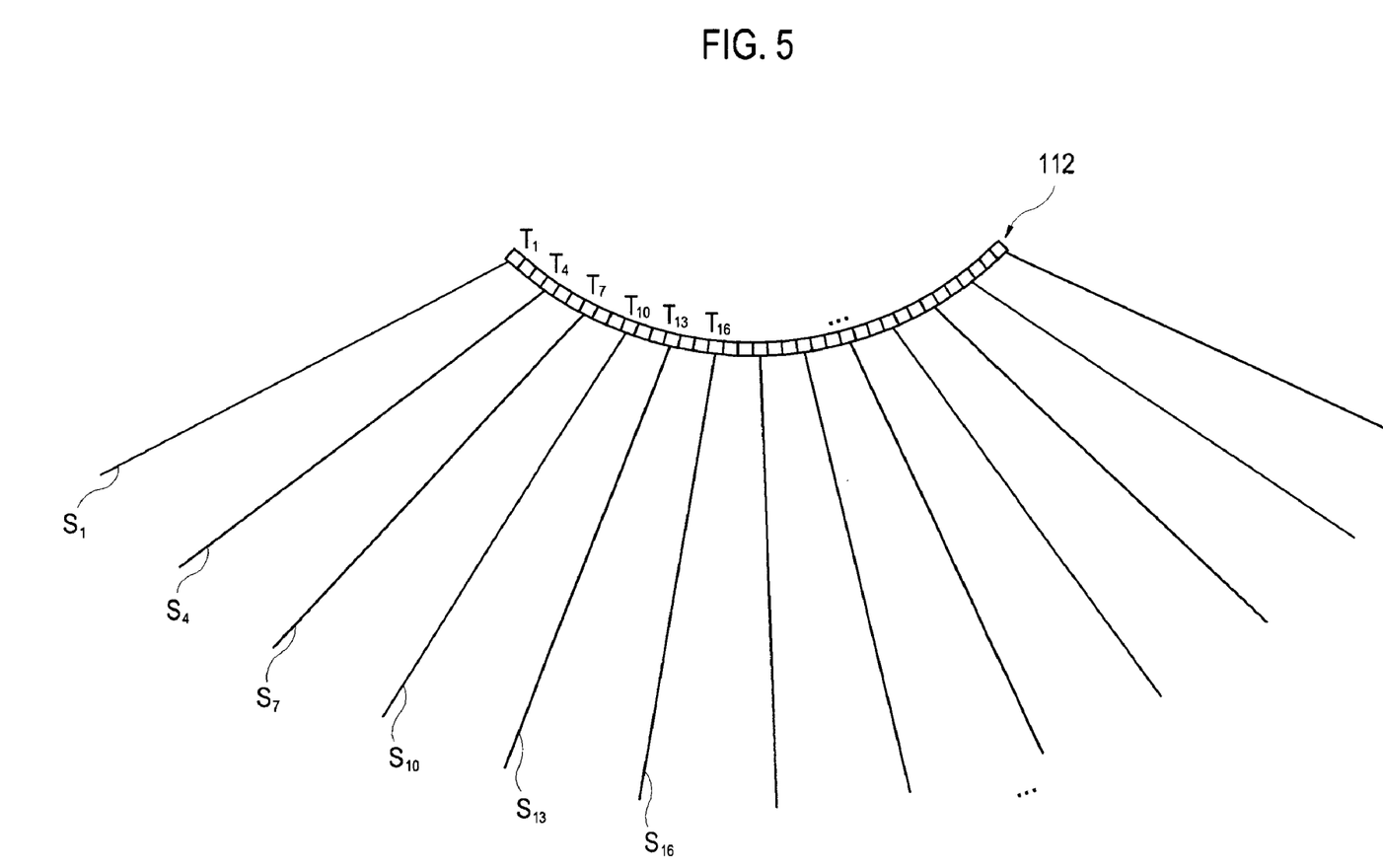
FIGS. 5 to 7 show an example of determining groups of scan lines in accordance with an embodiment of the present invention.
Figure 6:
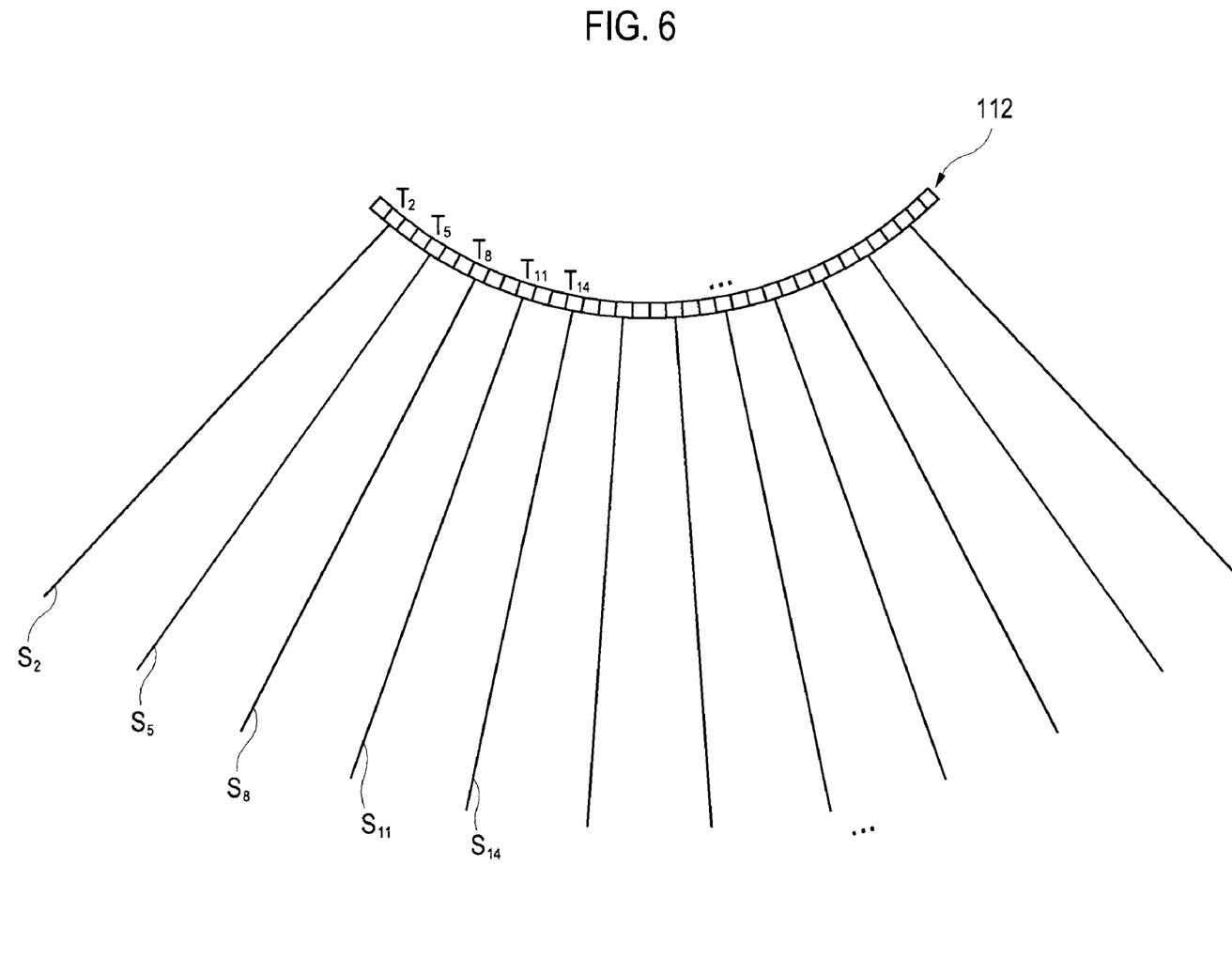
Figure 7:
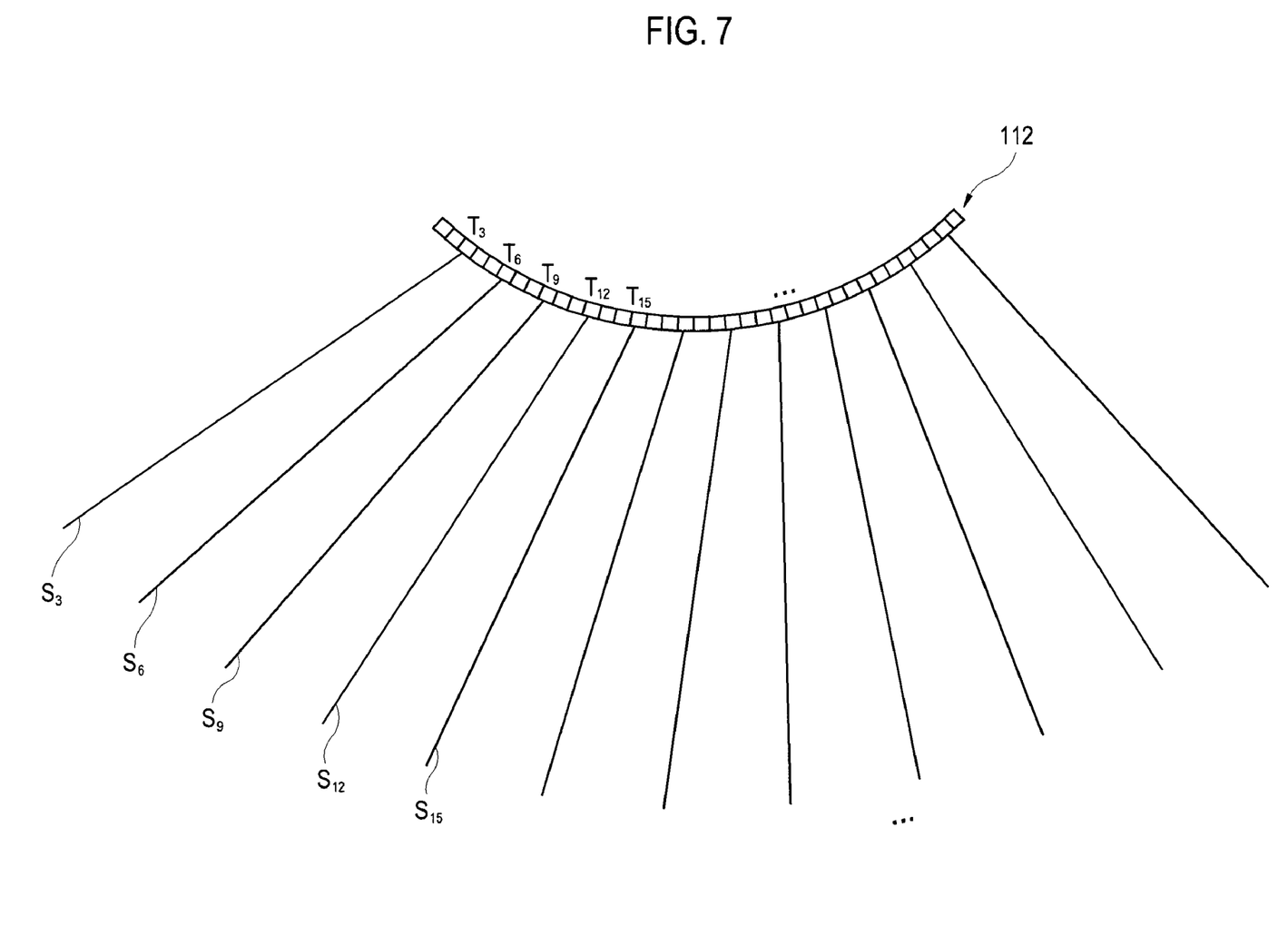
Figure 8:
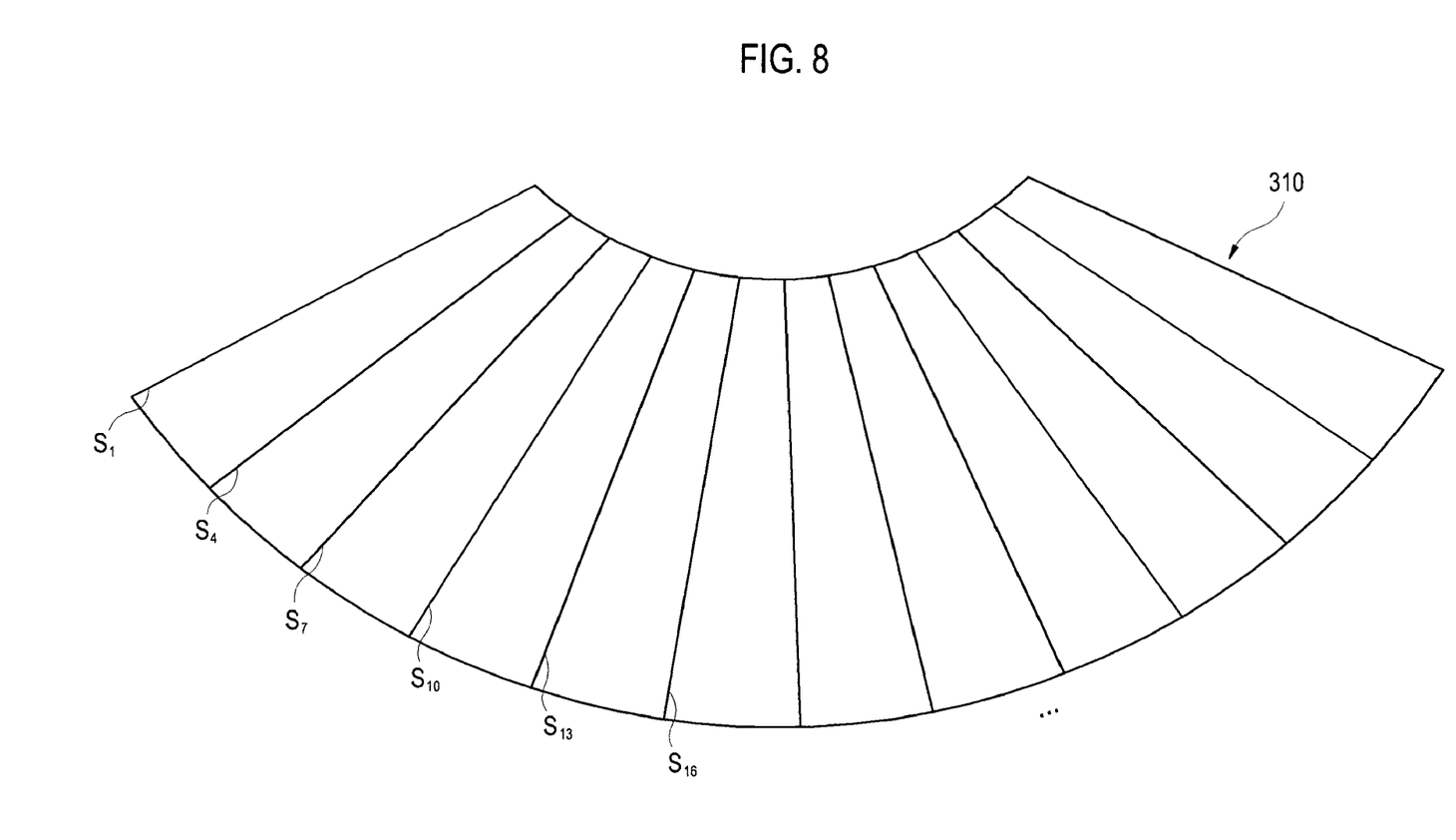
FIGS. 8 to 10 show an example of sub-frames of the respective scan-line groups in accordance with an embodiment of the present invention.
Figure 9:
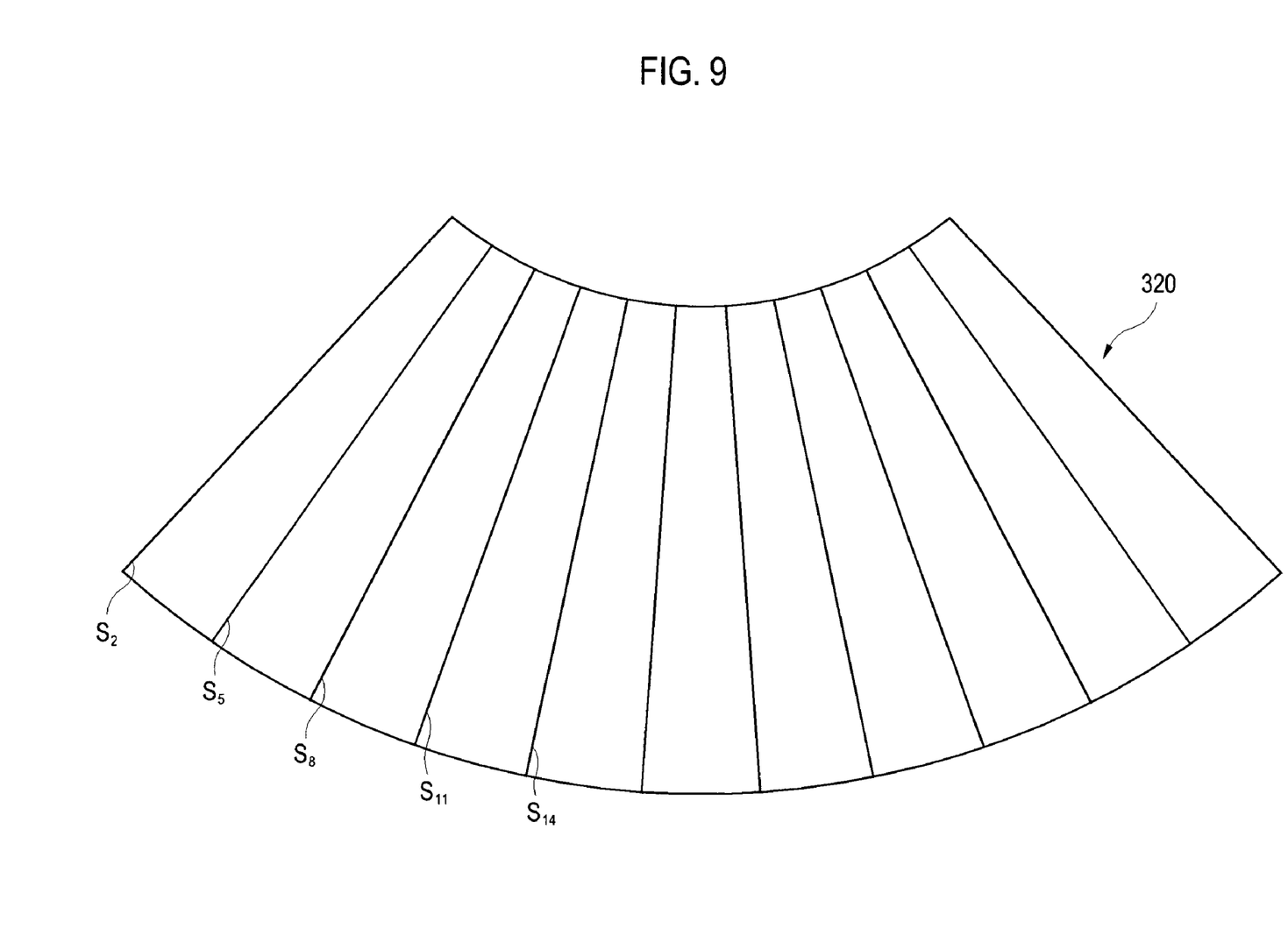
Figure 10:
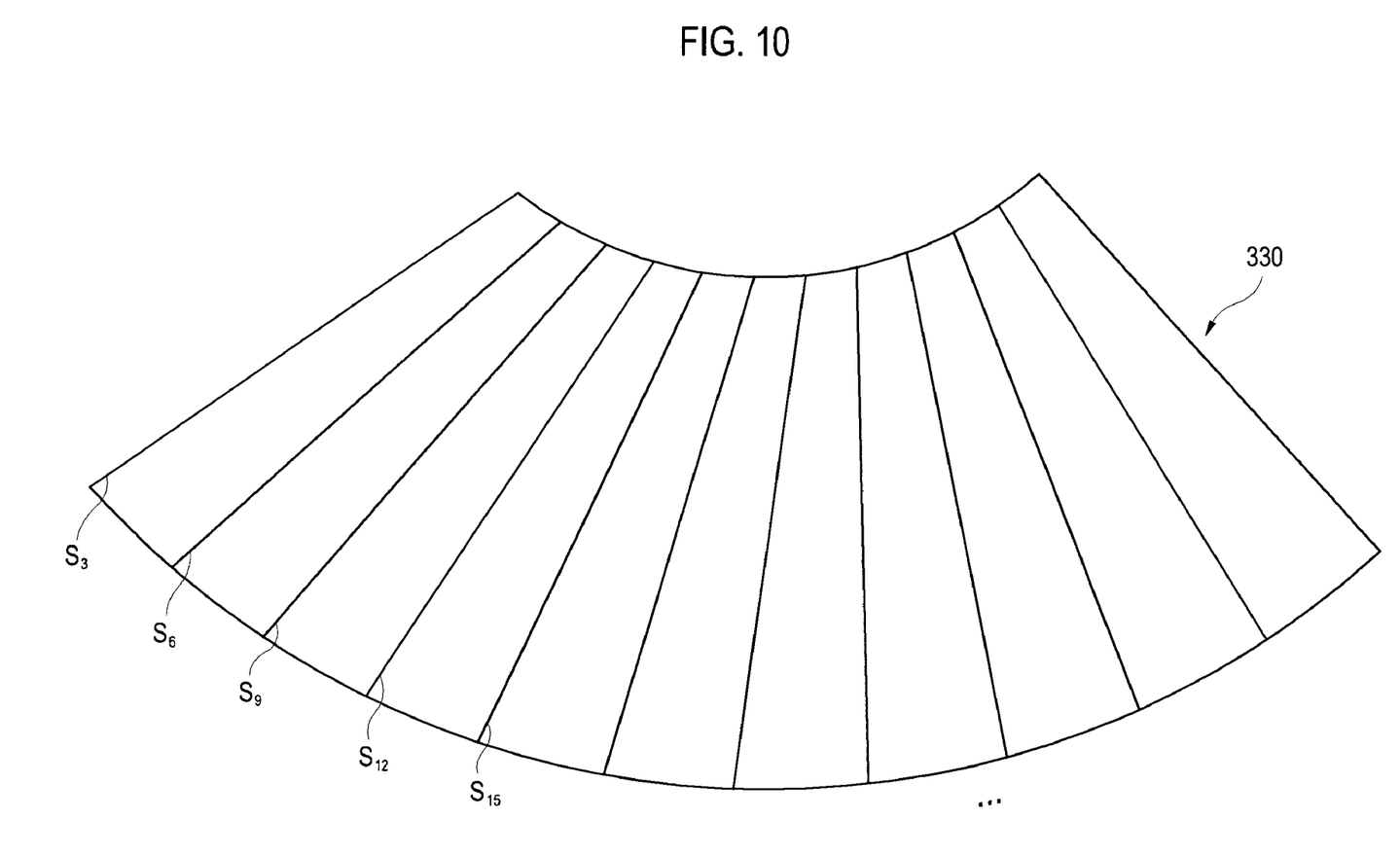

In order to obtain a plurality of sub-frames, the controller 123 performs control whenever the frame changes so that ultrasound signals are transmitted along the scan lines of the scan-line groups corresponding to the respective sub-frames. In an embodiment of the present invention, in order to obtain a first sub-frame 310 as shown in FIG. 8, the controller 123 performs control so that ultrasound signals are transmitted along the respective scan lines $\{S_1, S_4, S_7, \ldots, S_{n-2}\}$ of the first scan-line group as shown in FIG. 5. The controller 123 further performs control so that ultrasound signals are transmitted along the respective scan lines $\{S_2, S_5, S_8, \ldots, S_{n-1}\}$ of the second scan-line group as shown in FIG. 6. This is in order to obtain a second sub-frame 320 as shown in FIG. 9. Further, the ultrasound signals are transmitted along the respective scan lines $\{S_3, S_6, S_9, \ldots, S_n\}$ of the third scan-line group as shown in FIG. 7 in order to obtain a third sub-frame 330 as shown in FIG. 10. The controller 123 also controls the processor 140 to synthesize a plurality of sub-frames based on the virtual common points, the steering angles, the transducer groups and the scan-line groups, thereby forming one frame of the ultrasound image.

Figure 11:
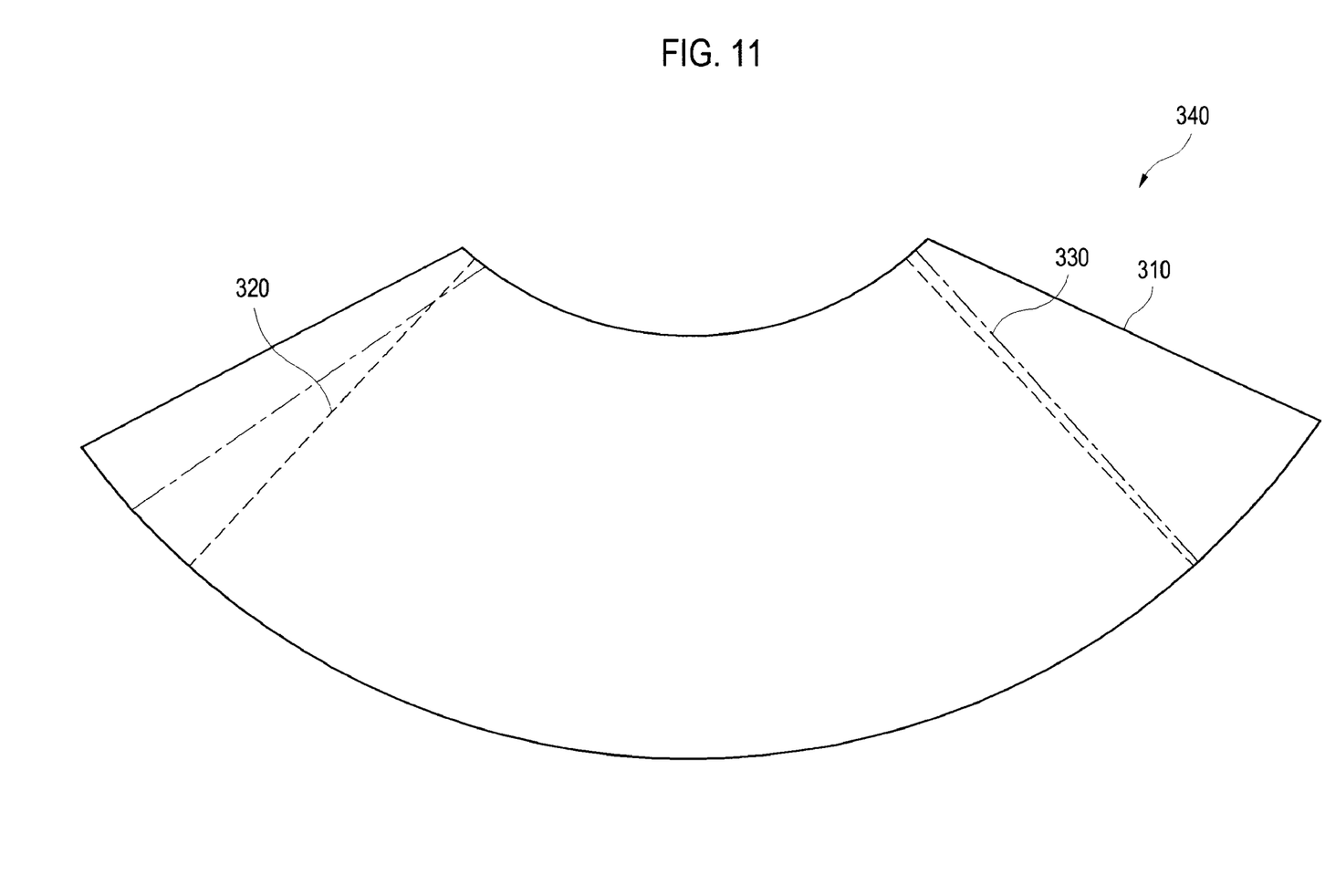
FIG. 11 shows an example of a frame formed by spatially synthesizing sub-frames in accordance with an embodiment of the present invention.

Under the control of the controller 123, the beam-former 130 delays and sums up the ultrasound signals, which are transmitted and received by the transducers along scan lines corresponding to each of the scan-line groups. The processor 140 forms one frame by spatially synthesizing a plurality of sub-frames provided by the beam-former 130 under the control of the controller 123. It then forms an ultrasound image signal based on the synthesized frame. In an embodiment of the present invention, the processor 140 spatially synthesizes sub-frames 310 to 330 as shown in FIGS. 8 to 10 to form a frame 340 as shown in FIG. 11. In such a case, the processor 140 may perform the synthesizing by calculating average of each pixel (e.g., averaged intensity of each pixel) through a plurality of sub-frames 310 to 330, or by providing different weights on the sub-frames. The processor 140 may further perform interpolation processing on each sub-frame using a variety of image interpolation methods before spatially synthesizing the sub-frames. The processor 140 may also include a storage unit to temporarily store the sub-frames. The display unit 150 receives the ultrasound image signal from the processor 140 and displays the ultrasound image.

Any reference in this specification to "one embodiment," "an embodiment," "example embodiment," etc., means that a particular feature, structure or characteristic described in connection with the embodiment is included in at least one embodiment of the invention. The appearances of such phrases in various places in the specification are not necessarily all referring to the same embodiment. Further, when a particular feature, structure or characteristic is described in connection with any embodiment, it is submitted that it is within the purview of one skilled in the art to affect such feature, structure or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. For example, although the embodiments have been described as employing a curved linear probe, the present invention is not limited thereto, and it is also possible to use a linear probe, in which case a plurality of virtual common points may be formed by moving a common point located in an infinite point. In addition to variations and modifications in the component parts and/or arrangements, alternative uses will also be apparent to those skilled in the art.

What is claimed is:

1. An ultrasound system for forming an ultrasound image by using a plurality of sub-frames, comprising:
    a curved linear probe including a transducer array, the transducer array comprising a plurality of transducers configured to transmit and receive ultrasound signals along a plurality of scan lines to obtain sub-frames;
    a determination unit configured to set a common point where extensions of the scan lines with respect to the transducers intersect at a back side of the transducer array and move the common point in a plurality of predetermined directions to determine a plurality of virtual common points at the back side of the transducer array, the determination unit further being configured to determine a plurality of transducer groups, steering angles, and a plurality of scan-line groups, wherein the plurality of scan-line groups correspond to the plurality of transducer groups and the plurality of virtual common points, respectively;
    a controller configured to control the transmission of the ultrasound signal along the scan lines of the scan-line groups corresponding to the respective sub-frames based on the plurality of transducer groups and the steering angles; and
    a processor configured to synthesize the plurality of sub-frames to form an ultrasound image.

2. The ultrasound system of claim 1, wherein the determination unit includes:
    a first determination unit for determining the plurality of transducer groups by grouping the plurality of transducers according to a number of the virtual common points;
    a second determination unit for determining each scan-line group by selecting the scan lines corresponding to the transducers in each transducer group; and
    a third determination unit for determining the steering angles of the scan lines with respect to the transducers such that the extensions of the scan lines in each scan-line group with respect to the transducers in the corresponding transducer group intersect at the corresponding virtual common point.

3. The ultrasound system of claim 1, wherein the processor includes:
    a unit for calculating an averaged intensity of each pixel through the plurality of sub-frames and form the ultrasound image by synthesizing the plurality of sub-frames based on the calculated average intensity.

4. The ultrasound system of claim 1, wherein the processor includes:
    a unit for providing different weights on the plurality of sub-frames and form the ultrasound image by synthesizing the plurality of sub-frames provided with the different weights.

5. The ultrasound system of claim 1, wherein a front side of the transducer array of the curved linear probe is convex.

6. A method of forming an ultrasound image by using a plurality of sub-frames formed by using a curved linear probe including a transducer array, the transducer array comprising a plurality of transducers to transmit and receive ultrasound signals along a plurality of scan lines, comprising:
    (a) setting a common point where extensions of the plurality of scan lines with respect to the array transducer intersect at a back side of the transducer array;
    (b) moving the common point in a plurality of predetermined directions to determine a plurality of virtual common points;
    (c) determining a plurality of transducer groups, steering angles and a plurality of scan-line groups based on the plurality of virtual common points;
    (d) forming a plurality of sub-frames by transmitting and receiving ultrasound signals along the scan lines; and
    (e) forming an ultrasound image by synthesizing the plurality of sub-frames.

7. The method of claim 6, wherein the step (b) includes:
    (b1) determining the plurality of transducer groups by grouping a plurality of transducers according to a number of the virtual common points;
    (b2) determining each scan-line group by selecting the scan lines corresponding to the transducers in each transducer group; and
    (b3) determining the steering angles of the scan lines with respect to the transducers such that the extensions of the scan lines in each scan-line group with respect to the transducers in the corresponding transducer group intersect at the corresponding virtual common point.

8. The method of claim 6, wherein the step (e) includes:
    calculating averaged intensity of each pixel through the plurality of sub-frames and forming the ultrasound image by synthesizing the plurality of sub-frames based on the calculated average intensity.

9. The method of claim 6, wherein the step (e) includes:
    providing different weights on the plurality of sub-frames and forming the ultrasound image by synthesizing the plurality of sub-frames provided with the different weights.

10. The method of claim 6, wherein the step (a) includes:
    setting the common point based on the extensions of the plurality of scan lines emitted from a convex front side of the transducer array of the curved linear probe.

* * * * *